(12) United States Patent
Bailey

(10) Patent No.: US 7,222,643 B2
(45) Date of Patent: May 29, 2007

(54) INTERNAL POST FLOW CONTROL

(75) Inventor: James Christopher Bailey, Yellow Springs, OH (US)

(73) Assignee: Vernay Laboratories, Inc., Yellow Springs, OH (US)

( * ) Notice: Subject to any disclaimer, the term of this patent is extended or adjusted under 35 U.S.C. 154(b) by 0 days.

(21) Appl. No.: 10/970,598

(22) Filed: Oct. 21, 2004

(65) Prior Publication Data

US 2006/0086399 A1    Apr. 27, 2006

(51) Int. Cl.
*F16L 55/02* (2006.01)
*G05D 7/01* (2006.01)

(52) U.S. Cl. .................................... 138/45; 44/46
(58) Field of Classification Search ............. 138/45, 138/46, 44

See application file for complete search history.

(56) References Cited

U.S. PATENT DOCUMENTS

| | | | | |
|---|---|---|---|---|
| 1,657,663 A |   | 1/1928 | Devereux | 138/45 |
| 2,444,677 A | * | 7/1948 | Rosenblum | 138/45 |
| 2,454,929 A | * | 11/1948 | Kempton | 138/45 |
| 2,568,519 A |   | 9/1951 | Smith | 138/45 |
| 2,891,578 A |   | 6/1959 | Dahl et al. | 138/45 |
| 2,899,979 A |   | 8/1959 | Dahl et al. | 138/45 |
| 2,936,788 A | * | 5/1960 | Dahl et al. | 138/45 |
| 2,939,487 A |   | 6/1960 | Fraser et al. | 138/45 |
| 3,072,151 A |   | 1/1963 | Quercia | 138/45 |
| 3,095,175 A |   | 6/1963 | Iketani | 138/454 |
| 3,121,445 A |   | 2/1964 | Wisniewski | 138/45 |
| 3,409,050 A | * | 11/1968 | Weese | 138/45 |
| 3,833,019 A |   | 9/1974 | Diggs | 138/45 |
| 4,248,270 A | * | 2/1981 | Ostrowski | 138/45 |
| 4,344,459 A |   | 8/1982 | Nelson | 138/45 |
| 4,492,339 A |   | 1/1985 | Kreitzberg | 239/230 |
| 4,508,144 A |   | 4/1985 | Bernett | 138/45 |
| 4,527,595 A |   | 7/1985 | Jorgensen et al. | 138/43 |
| 4,592,390 A |   | 6/1986 | Boyd | 138/45 |
| 4,609,014 A |   | 9/1986 | Jurjevic et al. | 138/45 |
| 4,883,093 A | * | 11/1989 | Miles et al. | 138/45 |
| 4,938,259 A |   | 7/1990 | Schmidt | 138/45 |
| 4,986,312 A |   | 1/1991 | Gute | 138/45 |
| 5,027,861 A |   | 7/1991 | Gute | 138/45 |
| 5,082,240 A | * | 1/1992 | Richmond | 251/120 |
| 5,209,265 A | * | 5/1993 | Taguri et al. | 138/45 |
| 5,226,446 A |   | 7/1993 | Cooper | 137/517 |
| 5,261,459 A |   | 11/1993 | Atkinson et al. | 137/846 |
| 5,487,528 A | * | 1/1996 | Richmond | 251/127 |
| 5,634,491 A |   | 6/1997 | Benedict | 137/504 |
| 6,571,831 B1 | * | 6/2003 | Hart | 138/46 |
| 6,695,011 B2 |   | 2/2004 | Sochtig | 138/43 |
| 6,719,302 B2 |   | 4/2004 | Andrick | 277/604 |

\* cited by examiner

*Primary Examiner*—Patrick F. Brinson
(74) *Attorney, Agent, or Firm*—Thompson Hine LLP

(57) ABSTRACT

A flow control including an annular flexible member and an internal post disposed downstream of the flexible member is described. The annular flexible member has a deflectable inner edge that defines a passage channel and the annular flexible member and internal post define a control gap therebetween wherein the deflectable inner edge of the annular flexible member deflects axially under increasing fluid pressure to reduce the control gap and consequently control fluid flow.

20 Claims, 4 Drawing Sheets

INTERNAL POST FLOW CONTROL

BACKGROUND OF THE INVENTION

The present invention relates to a flow control device, and in particular to a flow control device which has an internal post in a passage channel which, in cooperation with an annular flexible member defines a control gap between the annular flexible member and the outer peripheral surface of the internal post to provide flow control under a range of pressures.

Devices for controlling the rate of flow of a fluid, primarily liquids, at varying line pressures, are utilized in a variety of applications, such as clothes washers and dishwashers, showers, faucets and plumbing valves, drinking fountains, ice makers, water softeners, automotive heating systems, fuel systems, water cooled equipment and heat exchangers, gas valves, pneumatic machine tools, respiratory controls, and water sprinklers.

One device capable of providing effective control for this wide variety of installations is a rubber flow control washer, which can be routinely engineered to maintain a constant flow rate despite variations in line pressure. For example, various rubber flow control washers are available for maintaining an essentially constant flow in a range of from less than 1 gpm to flows in excess of 100 gpm under pressure variations ranging from 15 psi to 150 psi.

Regardless of the specific application, generally a flow control washer is designed by specifying a rubber or rubber-like material having a requisite modulus of elasticity, thickness, diameter, contour and flow aperture to give the desired quantity of flow over a range of pressures likely to be encountered in the specific application for which the flow control has been designed.

It should also be noted that there is a class of valves which incorporate an apertured rubber or rubber-like member received between two relatively rigid members that can be advanced toward and retracted away from each other to squeeze and release the rubber part to change the diameter of the opening through it. For example, U.S. Pat. Nos. 1,657,663; 3,072,151; 3,095,175; and 3,833,019 each show constructions of this general type in which an attempt is made to control flow by changing the diameter of the orifice through a resilient valve element.

It should be noted, however, that devices of this type merely adjust the flow rate for a given line pressure, but fail to provide for pressure variations that may occur, so that if pressure increases with a device of this type, the flow rate will also increase, and conversely, should the line pressure decrease the flow rate will decrease.

In the particular applications shown in the above-noted patents, flow control under varying line pressure may not be of sufficient importance to warrant a control responsive to pressure variations. For example, U.S. Pat. No. 1,657,663 discloses a device adapted to control the flow of a lime emulsion or solution used for flotation in minerals separating apparatus, U.S. Pat. Nos. 3,072,151 and 3,095,175 are directed to devices for use in butane or propane lighters, and U.S. Pat. No. 3,833,019 covers a quick-connect fitting for a trickle type irrigation system.

Conventional flow control valves typically have a relatively limited range of pressures over which the control will regulate flow. Depending on the flow tolerance chosen, this range is typically about 6:1, highest to lowest pressure. A conventional flow control typically achieves flow control by constricting upon itself, that is, there is typically nothing inside the central hole so flow control depends on the flexible portion geometry constricting radially inward in such a way as to provide constant flow. It has proven difficult to devise the appropriate geometry to achieve the desired flow control over a wide range of pressures.

It would be desirable to have a flow control device which regulates flow over a wider range flow curve. Furthermore, it would be desirable to have a flow control design which allows for modifications or variations in the controlled flow rate by altering the size or shape of one or more components of the flow control. The ability to modify more than one variable in the design process allows more flexibility in the design and increased operating range.

SUMMARY OF THE INVENTION

In accordance with one manifestation of the present invention, a flow control including an annular flexible member having a deflectable inner edge that defines a passage channel and an internal post disposed downstream of the annular flexible member is provided. The internal post extends longitudinally from an upstream end portion to a downstream base portion wherein the internal post cross-sectional area increases from the upstream end portion to the downstream base portion. The flexible member and internal post define a control gap therebetween wherein the deflectable inner edge of the annular flexible member deflects axially under increasing fluid pressure thereby modifying the control gap. The precise shape of the internal post and the passage channel defined by the inner edge of the flexible member can be adjusted as needed to give the desired wide range flow curve and target control flow rate.

In accordance with the certain aspects of the present invention, the annular flexible member is rotationally symmetrical around a central longitudinal axis extending through the passage channel. In accordance with a more specific aspect of the invention, the annular flexible member is symmetrical around a point defined by the intersection of the central longitudinal axis and a plane transversely bisecting the annular flexible member. Therefore, in accordance with this embodiment of the present invention, the annular flexible member can be inserted into the housing without regard to axial orientation.

In accordance with another aspect of the present invention, the annular flexible member includes an outer peripheral portion and the outer peripheral portion is of greater thickness than the inner edge. The outer peripheral portion of the annular flexible member is typically retained in a housing while the inner edge is free to deflect axially when subjected to a certain threshold pressure flow. The term "retained" as used herein refers to the outer portion being disposed in the housing such that it is not displaced during fluid flow. Accordingly, in accordance with certain aspects of the invention there may be a small clearance between the flexible member and the housing such that the flexible member cannot fall out of position. The flexible member may be free to move naturally other than being supported from downstream by a downstream portion of the housing. Deflection of the inner edge of the annular flexible member in the axial direction changes the control gap defined by the inner edge and the outer periphery of the internal post. Typically, the control gap is reduced as the pressure increases to thereby provide a relatively constant flow. The precise shape of the central post, the size of the passage channel defined by the inner edge of the annular flexible member and the shape and flexibility of the flexible member can be modified to provide controlled flow over a wide range of pressures.

BRIEF DESCRIPTION OF THE DRAWINGS

Further features of the invention are provided in the following description of a particular embodiment of the invention, wherein.

DETAILED DESCRIPTION

All documents cited are, in relevant part, incorporated herein by reference; the citation of any document is not to be construed as an admission that it is prior art with respect to the present invention.

The embodiment disclosed below is not intended to be exhaustive or limit the invention to the precise form disclosed in the following detailed description. Rather, the embodiment is described so that others skilled in the art may utilize its teachings, but represents only certain manifestations of the invention.

Figure 1:
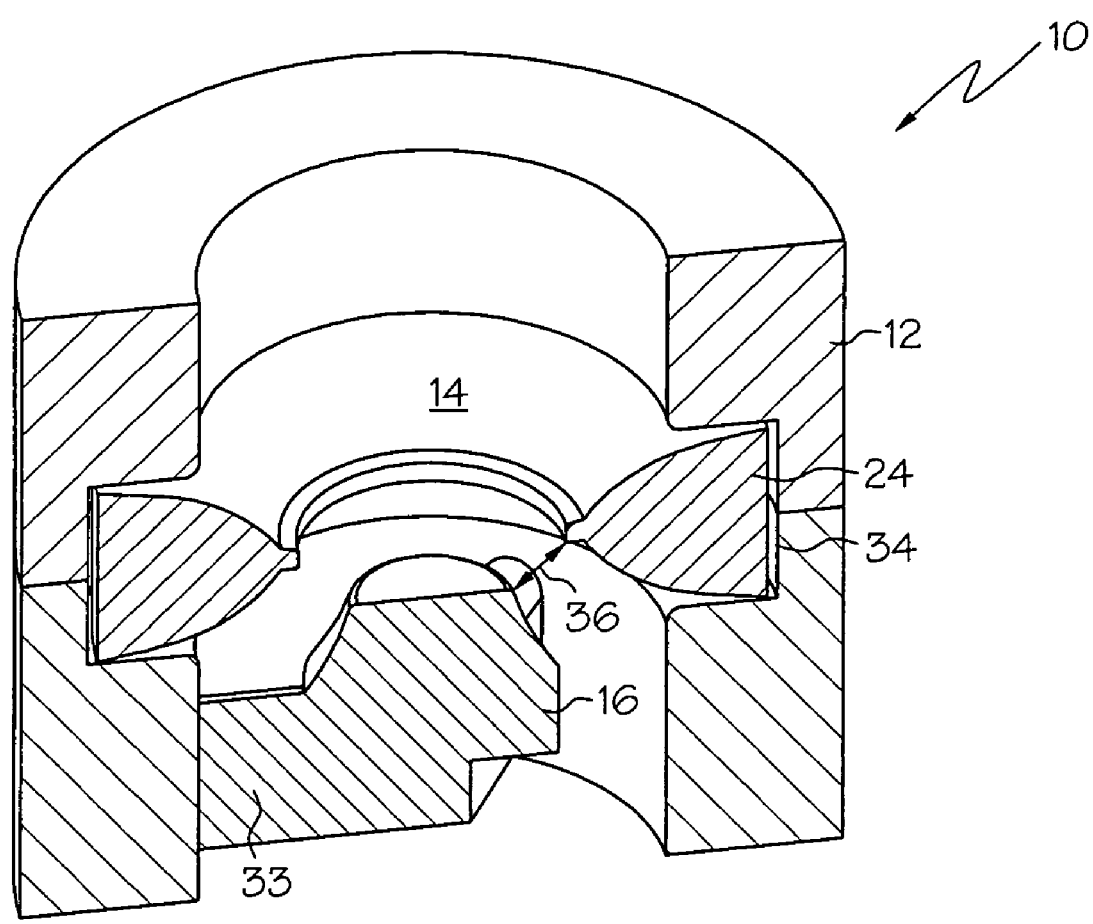
FIG. 1 is a perspective sectional view of a flow control and a housing according to one aspect of the present invention.

Referring to FIG. 1, the flow control assembly is indicated generally at 10 and includes a housing 12, an annular flexible member 14 and an internal control post 16. The annular flexible member 14 includes a deflectable inner edge 18 which defines a passage channel 20. The passage channel 20 extends axially along a central longitudinal axis 22 of the flow control assembly 10. The cross-section of the passage channel 20 varies along the central longitudinal axis 22. Furthermore, as described in more detail below, the cross-section of the passage channel 20 changes in response to increasing fluid pressure which causes the inner edge 18 of the annular flexible member 14 to deflect axially thereby altering the cross-section of the passage channel 20.

In accordance with the embodiment illustrated herein, the annular flexible member 14 includes an outer peripheral portion 24. The annular flexible member 14 extends radially inward from the outer peripheral portion 24 to the deflectable inner edge 18. In accordance with certain embodiments and as shown in the drawings, the outer peripheral portion 24 may be of greater thickness than the deflectable inner edge 18. Also as illustrated herein, the deflectable inner edge 18 of the annular flexible member 14 may include a radially inwardly extending rim 26. The rim 26 is positioned peripherally around the passage channel 20. The rim 26, in cross-section, has a generally rectangular shape. Nonetheless, the shape of the rim 26 not particularly limited and various other shapes such as arcuate, triangular, etc. can be used. In accordance with still other embodiments of the invention, the deflectable inner edge 18 does not include a noticeable rim. The deflectable inner edge 18 may be formed by continuation of the arc, line or shape of the annular flexible member 14 from the outer peripheral portion 24 to the inner edge 18. The shape of the annular flexible member 14 typically is selected to provide the desired properties of the annular flexible member 14. Accordingly, the annular flexible member 14 should provide the necessary durability and be capable of providing the required flexibility to maintain flow control over a wide range of pressures.

The annular flexible member 14 may be manufactured from a suitable conventional elastomeric material in a conventional manner. The material forming the flexible member may be, for example, a synthetic or natural elastomeric or rubber material. Exemplary elastomeric materials which may be used in making the annular flexible member include, but are not limited to, polyisoprene, neoprene, butadiene-acrylonitrile copolymers, ethylene-butadiene block copolymers, ethylene-propylene based copolymers, natural rubber, polychloroprene rubber, polyisoprene-isobutylene copolymers, silicone rubber, styrene-acrylonitrile copolymers, styrene-butadiene copolymers, styrene-maleic anhydride copolymers, and so forth. Particularly useful elastomeric materials include nitrile rubbers, hydrogenated nitrile rubber, ethylene-propylene-diene polymers (EPDM) and combinations thereof. In accordance with particular embodiments of the present invention the elastomeric material comprises an elastomer having a hardness range from about 3 to 100.

In accordance with particular embodiments of the present invention and as illustrated in the drawings, the annular flexible member is rotationally symmetrical around central longitudinal axis 22 and symmetrical to a plane transversely bisecting the annular flexible member 14. The annular flexible member is also symmetrical relative to a point where the central longitudinal axis intersects the plane transversely bisecting the annular flexible member. Accordingly, the annular flexible member 14 can be inserted in the housing without regard to the axial orientation of the flexible member.

Figure 2:
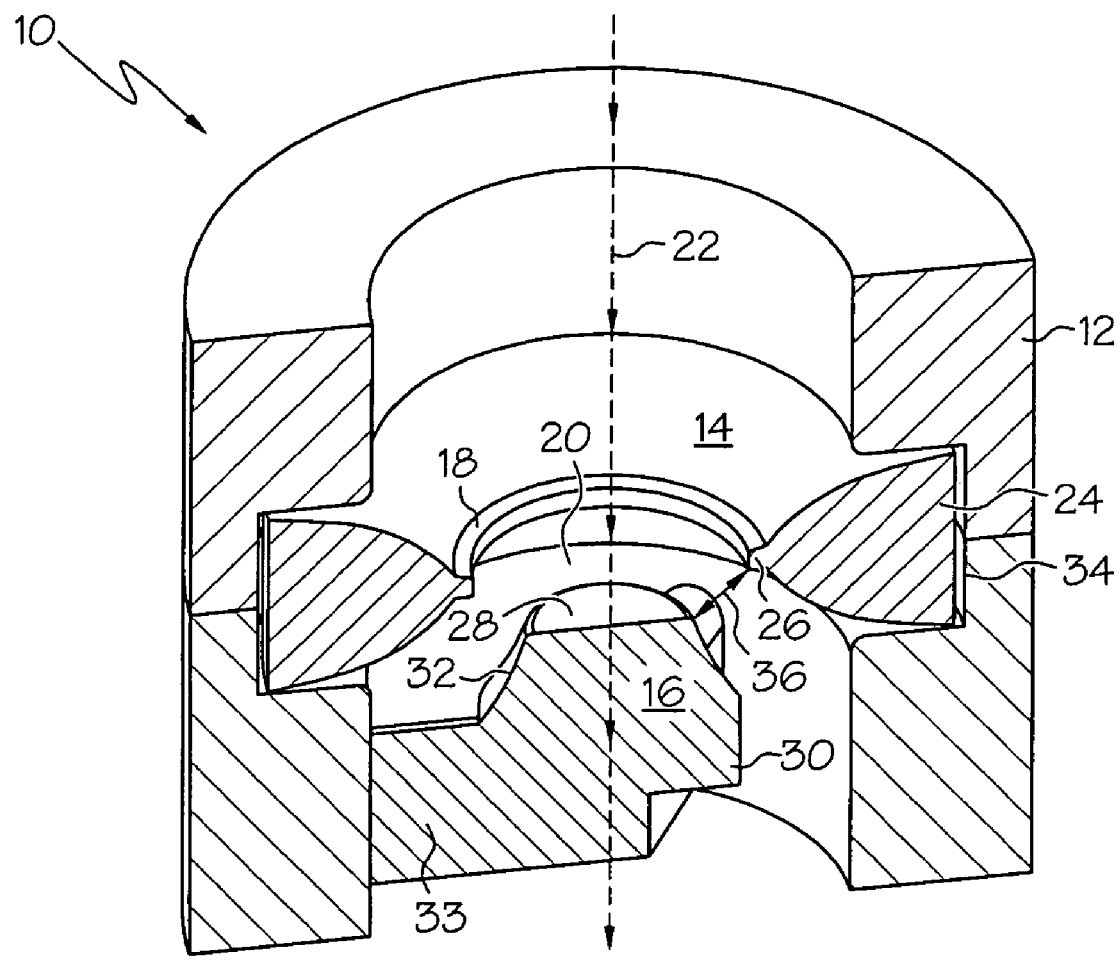
FIG. 2 is a perspective cross-sectional view through a flow control as shown in FIG. 1 and specifically illustrating the operation of the flow control under low pressure conditions.
Figure 3:
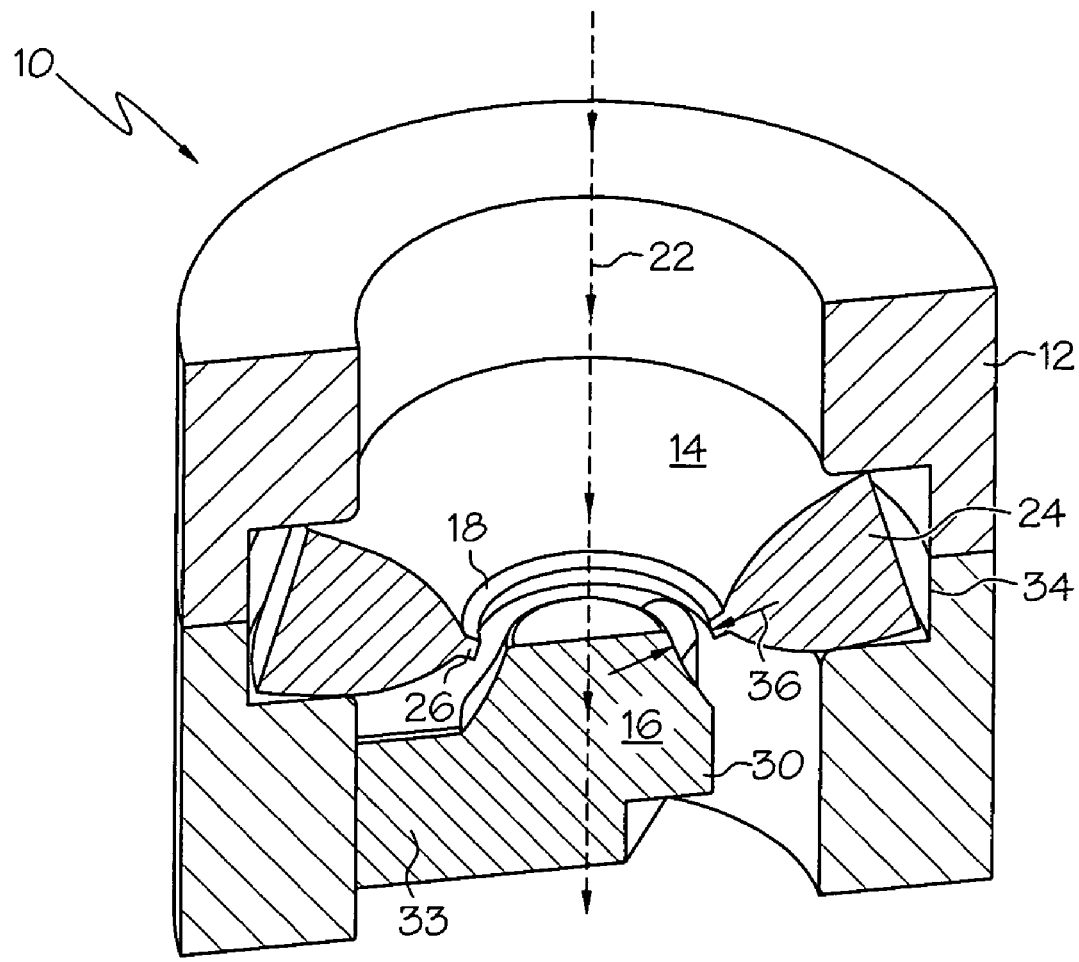
FIG. 3 is a perspective cross-sectional view similar to FIG. 2 illustrating the response of the flow control to high-pressure conditions.

Referring to FIGS. 1, 2 and 3, control post 16 is shown as disposed in the flow control assembly 10 adjacent to the downstream side of the annular flexible member 14. The central post 16 extends longitudinally from an upstream end portion 28 to a downstream base portion 30. The cross-sectional area of the internal post 16 generally increases from the upstream end portion 28 to the downstream base portion 30. As shown in the accompanying figures, the internal post 16 may include a generally frustoconical portion 32 extending from the upstream end portion 28 to the downstream base portion 30. Of course, the present invention is not limited to the specific shape of the internal post 16 set forth in the drawings. A variety of shapes can be utilized to provide the desired interaction with the deflectable inner edge 18 of the annular flexible member 14 to provide the desired flow control. Furthermore, although the upstream end portion 28 of the internal post 16 is shown as being a relatively flat surface, the upstream end portion 28 could just as well be rounded or conical in shape. Although the upstream end portion 28 could extend beyond the annular flexible member in the upstream direction, in accordance with particular embodiments of the invention, the upstream end portion 28 of the internal post 16 is disposed downstream of a plane transversally bisecting the annular flexible member.

In accordance with the embodiment shown, the internal post 16 has one or a plurality of radial spokes 33 extending between the base 30 of the internal post and housing 12. The housing 12 further includes an annular groove 34 which receives the outer peripheral portion 24 of the annular flexible member 14.

The deflectable inner edge 18 of the annular flexible member 14 and the outer periphery of the internal post 16 define a control gap 36 therebetween. In use, the flow control assembly 10 provides controlled flow under a range of pressures. At low pressures, the deflectable inner edge 18 of the annular flexible member 14 maintains its position and fluid flow through the passage channel 20 and the control gap 36 is maintained with the control gap 36 at its maximum open condition. As the pressure is increased, the deflectable inner edge 18 of the annular flexible member 14 deflects axially downstream thereby reducing the control gap 36 as the deflectable inner edge 18 approaches the outer periphery of the internal control post 16. Flow through the annular passage channel 20 adjacent the internal post 16 is thus progressively reduced as the deflectable inner edge 18 of the annular flexible member 14 deflects and narrows the control gap 36.

The flow control of the present invention is capable of regulating flow over a wide range of pressures typically from about 10:1, but could be used at even higher ratios by adjusting the size of the passage channel 20 defined by the annular flexible member 14 and modifying the shape of the internal control post 16. The flow control of the present invention may provide substantially constant flow over various pressure ranges, such as from about 15 to 150 psi, from about 12 to 120 psi or from about 5 to 100 psi. Although the constant flow provided by the flow control is not particularly limited, the flow controls will typically provide a flow rate of from about 0.63 to about 10 gpm (gallons per minute).

Figure 4:
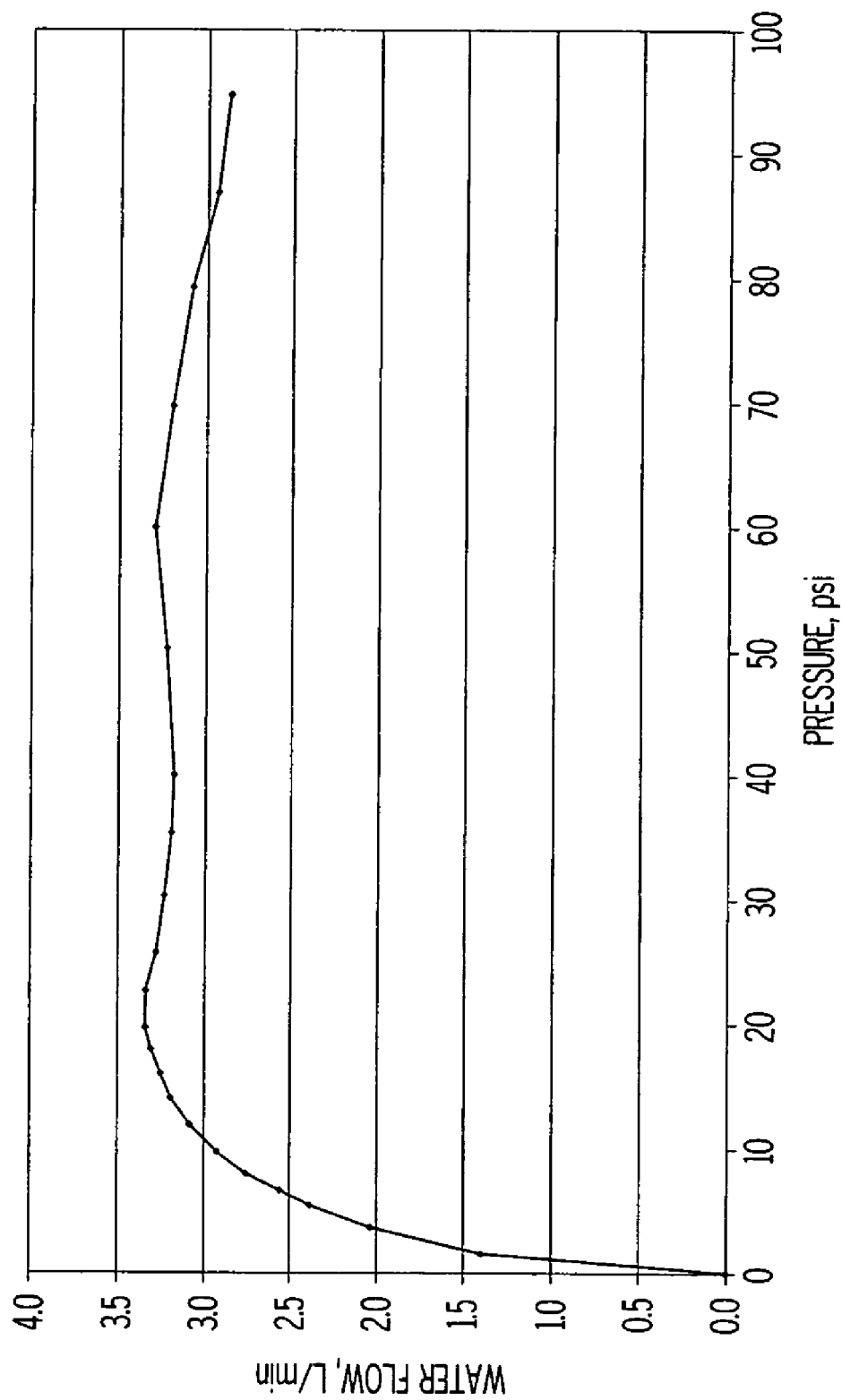
FIG. 4 is a graph illustrating flow control measured for a particular embodiment of the invention.

In accordance with certain aspects of the present invention, the passage channel defined by the inner edge 18 of the annular flexible member 14 has a substantially circular cross-section and the passage channel 20 defined by the internal post 16 and the inner edge 18 of the annular flexible member 14 has a substantially annular cross-section. Modifying the cross-sectional area of the flow control from circular to annular enables the flow control of the present invention to maintain a relatively constant or controlled flow as illustrated by the graph of FIG. 4. FIG. 4 illustrates the flow control measured for a particular embodiment of the present invention.

While the forms of apparatus herein described constitute particular embodiments of this invention, it is to be understood that the invention is not limited to these precise forms of apparatus, and that changes may be made therein without departing from the scope of the invention which is defined in the appended claims.

What is claimed is:

1. A flow control comprising:
an annular flexible member having a deflectable inner edge defining a passage channel wherein the deflectable inner edge of the annular flexible member comprises a radially inwardly extending rim; an internal post, at least a portion of said internal post being disposed downstream of the annular flexible member, the internal post extending longitudinally from a solid upstream end portion to a downstream base portion wherein the internal post cross-sectional area increases from the upstream end portion to the downstream base portion, the annular flexible member and internal post defining a control gap therebetween wherein the deflectable inner edge of the annular flexible member deflects axially under increasing fluid pressure thereby reducing the control gap.

2. The flow control of claim 1 further comprising a housing having a longitudinally extending passage way therethrough with a central longitudinal axis wherein said annular flexible member and said internal post are disposed in said passageway.

3. The flow control of claim 2 wherein the annular flexible member is rotationally symmetrical around the central longitudinal axis.

4. The flow control of claim 1 wherein the annular flexible member has an outer peripheral portion and the outer peripheral portion is of greater thickness than said inner edge.

5. The flow control of claim 1 wherein the annular flexible member is formed from an elastomeric material.

6. The flow control of claim 5 wherein the elastomeric material is selected from the group consisting of nitrile rubbers, hydrogenated nitrile rubbers, ethylene-propylene-diene polymers (EPDM) and combinations thereof.

7. The flow control of claim 5 wherein the elastomeric material is an elastomer having a hardness range from about 3 to 100.

8. The flow control of claim 1 wherein said flow control provides substantially constant flow over a pressure range of from about 5 to 100 psi.

9. The flow control of claim 1 wherein the passage channel defined by the inner edge of the annular flexible member has a substantially circular cross-section.

10. The flow control of claim 9 wherein the passage channel has a substantially annular cross-section as defined by the internal post and the inner edge of the annular flexible member.

11. The flow control of claim 1 wherein the upstream end portion of the internal post is disposed downstream of a plane transversely bisecting the annular flexible member.

12. The flow control of claim 1 wherein the annular flexible member is substantially symmetrical with respect to a plane transversely bisecting the annular flexible member.

13. The flow control of claim 2 wherein the housing comprises an annular groove and an outer peripheral portion of the annular flexible member is positioned within said annular groove.

14. A flow control assembly comprising:
a housing having a longitudinally extending passageway therethrough with a central longitudinal axis; and
a flow control disposed in the passageway of said housing wherein the flow control comprises:
an annular flexible member having a deflectable inner edge wherein the deflectable inner edge includes a radially inwardly extending rim and a solid internal post disposed downstream of the annular flexible member, said flow control including a flow passage of alterable cross-section, said flow passage having a first cross-section as defined by the deflectable inner edge of the annular flexible member and a second cross-section as defined by the deflectable inner edge of the annular flexible member and an outer periphery of the internal post,
said first cross-section being substantially circular and said second cross-section being substantially annular wherein the deflectable inner edge of the annular flow member deflects axially under increasing fluid pressure thereby altering said second cross-section to control flow of a fluid through said flow control assembly.

15. The flow control assembly of claim 14 wherein the annular flexible member has an outer peripheral portion and the outer peripheral portion is of greater thickness than the inner edge.

16. The flow control assembly of claim 15 wherein the housing comprises an annular groove and the outer peripheral portion of the annular flexible member is positioned within said annular groove.

17. The flow control assembly of claim 14 wherein said annular flexible member is formed from an elastomeric material.

18. A flow control comprising:
a housing having a longitudinally extending passage way therethrough with a central longitudinal axis;
an annular flexible member having a deflectable inner edge defining a passage channel;
an internal post, at least a portion of said internal post being disposed downstream of the annular flexible member, wherein said annular flexible member and said internal post are disposed in said passageway and the annular flexible member is rotationally symmetrical around the central longitudinal axis;
the internal post extending longitudinally from a solid upstream end portion to a downstream base portion wherein the internal post cross-sectional area increases from the upstream end portion to the downstream base portion,
the annular flexible member and internal post defining a control gap therebetween wherein the deflectable inner edge of the annular flexible member deflects axially under increasing fluid pressure thereby reducing the control gap.

19. The flow control of claim 18 wherein the deflectable inner edge includes a radially inwardly extending rim.

20. A flow control assembly comprising:
a housing having a longitudinally extending passageway therethrough with a central longitudinal axis; and
a flow control disposed in the passageway of said housing wherein the flow control comprises:
an annular flexible member having a deflectable inner edge wherein the annular flexible member is rotationally symmetrical around the central longitudinal axis and a solid internal post disposed downstream of the annular flexible member, said flow control including a flow passage of alterable cross-section, said flow passage having a first cross-section as defined by the deflectable inner edge of the annular flexible member and a second cross-section as defined by the deflectable inner edge of the annular flexible member and an outer periphery of the internal post,
said first cross-section being substantially circular and said second cross-section being substantially annular wherein the deflectable inner edge of the annular flow member deflects axially under increasing fluid pressure thereby altering said second cross-section to control flow of a fluid through said flow control assembly.

* * * * *